UNITED STATES PATENT OFFICE.

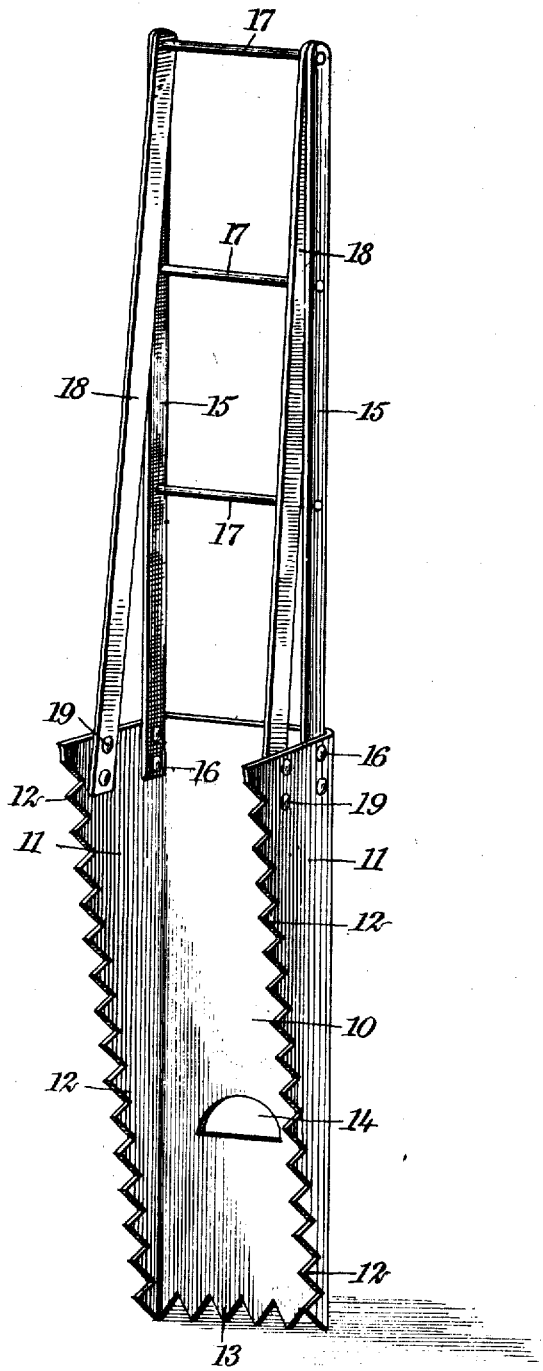

JESSE P. MANAHAN, OF RED BANK, NEW JERSEY.

DIGGING IMPLEMENT.

No. 902,983.　　　Specification of Letters Patent.　　　Patented Nov. 3, 1908.

Application filed May 13, 1908. Serial No. 432,599.

*To all whom it may concern:*

Be it known that I, JESSE P. MANAHAN, a citizen of the United States, and a resident of Red Bank, in the county of Monmouth and State of New Jersey, have invented a new and Improved Digging Implement, of which the following is a full, clear, and exact description.

This invention relates to digging implements, and more particularly to implements for turning sod, digging in excavations, and for similar purposes.

More specifically, the invention relates to a digging implement or spade having a blade provided with laterally disposed sides, and at the side edges and at the lower edge cutting teeth or serrations, the blade having secured thereto a handle provided with transverse rungs and itself having an opening which serves, like the rungs, to receive the foot of the operator, who can thus apply his weight at successive supports in forcing the implement gradually into the ground.

The object of the invention is to provide a simple, strong and durable digging implement, which can be forced easily into the ground by the application of the weight of the user, which has successive supports to receive the foot of the user as it is forced into the ground, and which is provided with teeth adapted to cut grass, weeds or the like which tend to obstruct the thrust of the implement into the ground.

The invention consists in the construction and combination of parts to be more fully described hereinafter and particularly set forth in the claims.

Reference is to be had to the accompanying drawing forming a part of this specification, in which the figure of the drawing is a perspective view of the implement.

Referring more particularly to the drawing, I provide a spade or shovel blade 10, fashioned from sheet iron or any other suitable material, and preferably of an elongated form and having the sides 11 laterally disposed and substantially parallel. The sides 11 taper to the lower side or cutting edge of the blade, and at the outer edges are provided with teeth or serrations 12 which may be of any suitable form. The lower side edge is provided with similar teeth 13. Thus the blade has at three sides an uninterrupted series of serrations or teeth which serve to sever vegetation or other obstructions, in forcing the blade into the ground in the operation of digging, with the implement. Somewhat nearer the lower than the upper side, the blade is provided with an opening 14 therethrough, the lower edge of which is substantially straight, and which is formed to receive the foot of the person operating the implement. In this way the operator can apply his weight to force the implement into the ground.

The sides 11, at the upper ends, and adjacent to the body of the blade 10, carry substantially parallel bars 15, fashioned from metal or other suitable material and secured in position by means of rivets 16 or the like. The bars 15 are joined at intervals by transverse members or rungs 17 which may be secured in place in any suitable manner, for example, by having the ends located in suitable openings of the bars. The number of the rungs can be varied in accordance with the length of the bars and the distance separating the rungs. The uppermost rung carries braces 18 which preferably have openings to receive the uppermost rung and which have the lower ends secured to the sides 11 near the outer edges thereof by means of rivets 19 or in any other suitable manner. The braces 18 serve to strengthen the bars 15.

It will be understood that the bars and the rungs constitute the handle of the digging implement which is operated as follows: The implement is arranged in a vertical position or at any desired angle and is forced into the ground by the application of the user's weight at the opening 14, the user holding the blade in position by grasping one of the rungs of the handle. The blade is then further forced into the ground by the application of the user's weight at the upper edge of the blade 10, the handle being grasped at a higher rung. The blade can be still further forced into the ground by the application of the weight of the operator at one of the rungs of the handle. It will be understood that by the provision of the successive supports offered by the opening 14, the edge of the blade and the rungs, the blade can be gradually thrust into the ground with little difficulty. After the blade has been thrust into the ground, a fulcrum support, such as a block of wood, is placed behind the blade, and the same is then forced outward and upward by means of the handle, the blade thus loosening and removing a quantity of soil. The device can then be dragged along the ground by means of the handle to the point where the earth is to be deposited.

Having thus described my invention, I claim as new and desire to secure by Letters Patent:

1. In an implement of the class described, a blade, and a handle, said handle affording a grip for the hands of the operator in digging with the implement, and further affording successive supports for the foot of the operator so that the implement can be forced into the ground by the imposed weight of the operator, said blade having an opening therethrough forming a support for the foot of the operator.

2. In an implement of the class described, a blade having laterally disposed sides, said sides tapering outwardly from the lower side edge, the edges of said laterally disposed sides and the lower side edge having serrations, said blade having an opening to receive the foot of the operator, spaced bars rigid with said blade, rungs connecting said bars, and braces connecting said bars and said laterally disposed sides.

3. In an implement of the class described, a blade having laterally disposed sides, said sides tapering outwardly from the lower side edge, spaced bars rigid with said blade, rungs connecting said bars and affording successive supports for the foot of the operator, and braces connecting said bars at the ends remote from said blade and said laterally disposed sides.

In testimony whereof I have signed my name to this specification in the presence of two subscribing witnesses.

JESSE P. MANAHAN.

Witnesses:
H. S. HIGGINSON,
M. LOUIS BROWN.